June 10, 1930. W. LANGE 1,762,870
BUFFER LIKE GUARD FOR VEHICLES
Filed July 8, 1929
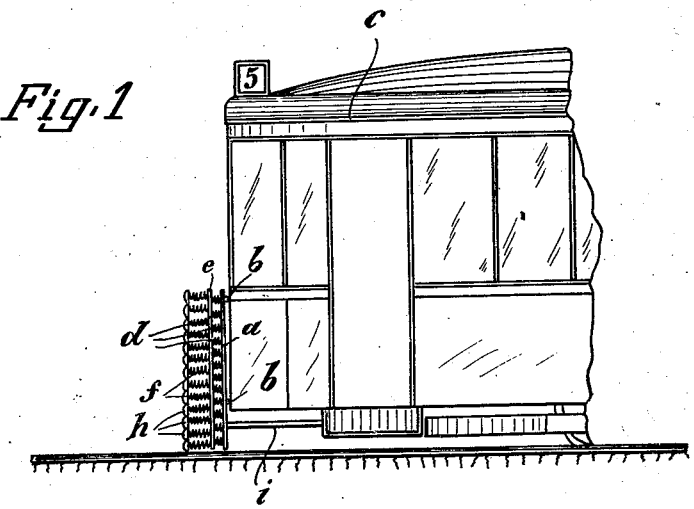
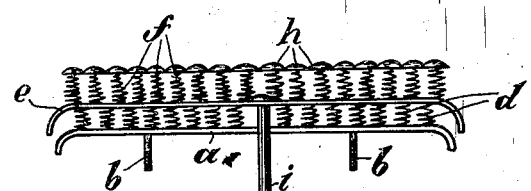
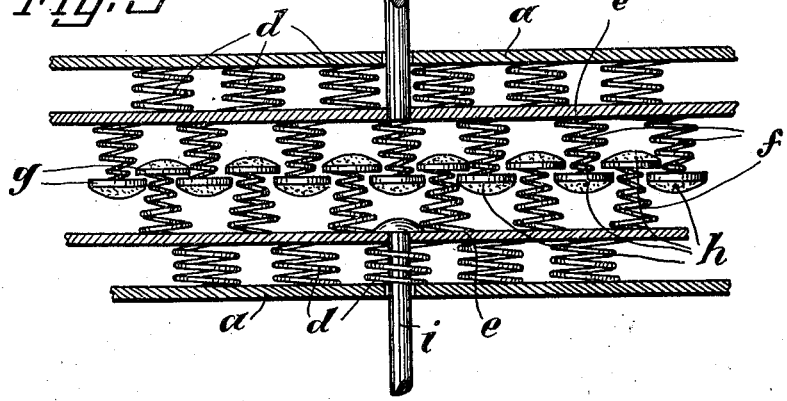

Patented June 10, 1930

1,762,870

UNITED STATES PATENT OFFICE

WILHELM LANGE, OF BERLIN-SPANDAU, GERMANY

BUFFER LIKE GUARD FOR VEHICLES

Application filed July 8, 1929, Serial No. 376,721, and in Germany July 6, 1928.

This invention relates to a guard to be arranged on the front end of a vehicle and designed to prevent persons from getting under the vehicle. These guards consist generally of a base plate rigidly connected with the vehicle and of one or several shock plates, spring supported in a suitable manner with regard to this base plate. By these guards only running over of persons can be prevented who are in front of the vehicle; they are however not constructed so that they can prevent the turning over of colliding vehicles.

According to the invention this inconvenience is avoided by mounting on the outer one of movable plates spiral springs of steel tapering towards the front end. On the conical end of each steel spring a rubber buffer is mounted, so that persons struck by the guard are not injured nor can they get under the vehicle, as the guard extends downwards almost to the road.

At a collision of two vehicles fitted with such guards the rubber buffers and the conical steel springs engage between each other, so that tumbling over of the vehicles or of one of said vehicles is prevented, as the vehicles are comparatively rigidly connected with each other by the springs inserted between each other.

To detach this connection, either a wooden hammer is used for hammering on the springs, or the extreme plates are removed from the vehicles and the springs singly liberated from the rear side of the plates.

Guards of this type are suitable for vehicles of any kind, like railway cars, tramway cars, autobusses or motor-cars. The guards can be built in such a manner that they scarcely impair the appearance of the vehicle. By the use of such guards the safety of the passengers at collisions is much increased, as tumbling over of the vehicles is prevented.

An embodiment of the invention is illustrated by way of example in the accompanying drawing in which:

Fig. 1 shows in side elevation a guard mounted on a vehicle.

Fig. 2 shows the guard in top plan view.

Fig. 3 shows in top plan view two guards pushed the one into the other through collision.

A base plate $a$ is fixed on a vehicle $c$ by suitable fastening means $b$. On this base plate $a$ a great number of cylindrical spiral springs $d$ are fixed the outer ends of which bear against a movable plate $e$. On the outer surface of this movable plate $e$ spiral springs $f$, tapering in forward direction, are fixed, which are made of very elastical tough material.

These steel springs $f$ have each on its front end a rubber buffer $h$ mounted in a cup $g$. The guard may be of semi-circular horizontal section or cornered and comprise several series of springs, so that it ensures the best possible protection against accidents.

I claim:

1. A buffer-like guard for vehicles, comprising in combination a base plate fixed on the vehicle, horizontal spiral springs on this base plate, a movable plate in front of these spiral springs, and conical steel springs fixed with their inner wide ends on said movable plate.

2. A guard as specified in claim 1, comprising in combination with the conical spiral springs, a rubber buffer on the outer end of each conical spring.

In testimony whereof I affix my signature.

WILHELM LANGE.